United States Patent
Saito et al.

(10) Patent No.: US 11,497,017 B2
(45) Date of Patent: Nov. 8, 2022

(54) BASE STATION APPARATUS AND USER APPARATUS

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 169 days.

(21) Appl. No.: 16/649,072

(22) PCT Filed: Sep. 25, 2017

(86) PCT No.: PCT/JP2017/034511
§ 371 (c)(1),
(2) Date: Mar. 19, 2020

(87) PCT Pub. No.: WO2019/058549
PCT Pub. Date: Mar. 28, 2019

(65) Prior Publication Data
US 2020/0267722 A1    Aug. 20, 2020

(51) Int. Cl.
*H04W 72/04* (2009.01)

(52) U.S. Cl.
CPC ..... *H04W 72/0446* (2013.01); *H04W 72/042* (2013.01)

(58) Field of Classification Search
CPC ............ H04W 72/0446; H04W 72/042; H04L 5/0048
See application file for complete search history.

(56) References Cited

U.S. PATENT DOCUMENTS

2018/0375614 A1* 12/2018 Shimezawa ......... H04L 25/0224
2019/0191441 A1*  6/2019 Kusashima ........... H04W 72/04
2020/0162303 A1*  5/2020 Kim .................... H04L 27/2675

OTHER PUBLICATIONS

International Search Report issued in PCT/JP2017/034511 dated Dec. 12, 2017 (5 pages).
Written Opinion of the International Searching Authority issued in PCT/JP2017/034511 dated Dec. 12, 2017 (4 pages).
LG Electronics; "On collision avoidance for PTRS and other RSs"; 3GPP TSG RAN WG1 Meeting NR Ad-Hoc #2, R1-1710291; Qingdao, P.R. China; Jun. 27-30, 2017 (5 pages).
Qualcomm; "WF on Remaining issues on DMRS"; 3GPP TSG RAN WG1 Meeting #90, R1-1715261; Prague, Czech Republic; Aug. 21-25, 2017 (14 pages).
Ericsson; "Summary of PTRS way forwards and offline discussions"; 3GPP TSG-RAN WG1 #90, R1-1715205; Prague, Czech Republic; Aug. 21-25, 2017 (4 pages).

* cited by examiner

*Primary Examiner* — Dady Chery
(74) *Attorney, Agent, or Firm* — Osha Bergman Watanabe & Burton LLP

(57) ABSTRACT

A base station apparatus performs communication with a user apparatus and includes a setting unit that arranges a reference signal used for phase correction in a radio frame at a predetermined interval and a transmitting unit that transmits the radio frame to the user apparatus, and, in a case in which the reference signal used for the phase correction is punctured in the radio frame, the reference signal used for the phase correction is arranged in a resource of the radio frame in which the reference signal used for the phase correction is arrangeable.

9 Claims, 14 Drawing Sheets

| Port indexing | Frequency offset: delta | FD-OCC | |
|---|---|---|---|
| XX0 | 0 | +1 | +1 |
| XX1 | 0 | +1 | −1 |
| XX2 | 2 | +1 | +1 |
| XX3 | 2 | +1 | −1 |
| XX4 | 4 | +1 | +1 |
| XX5 | 4 | +1 | −1 |

FIG.5
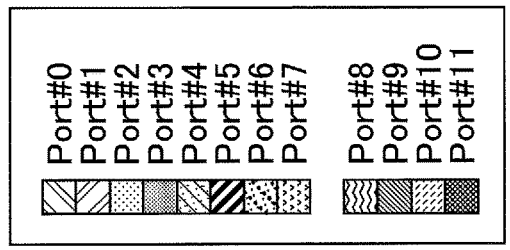
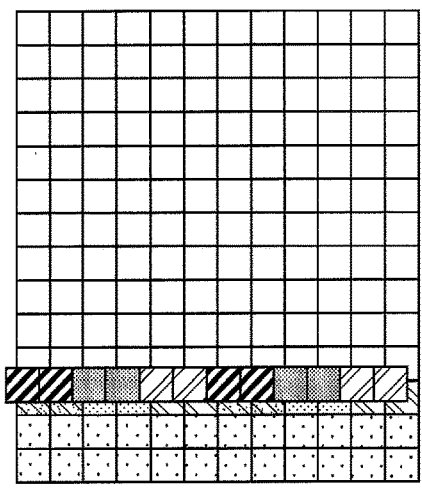
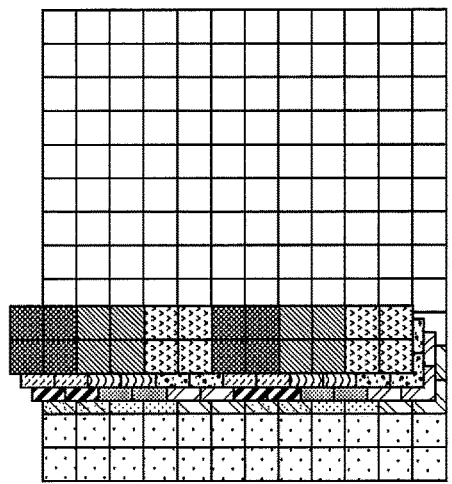
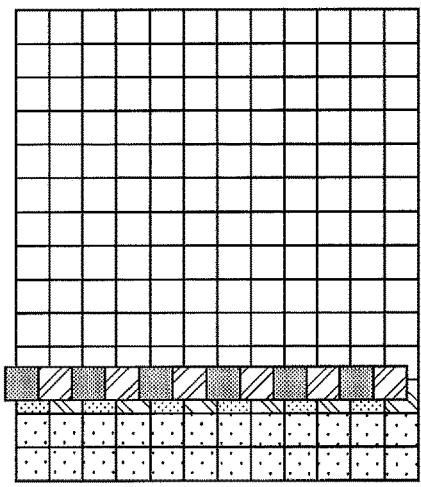
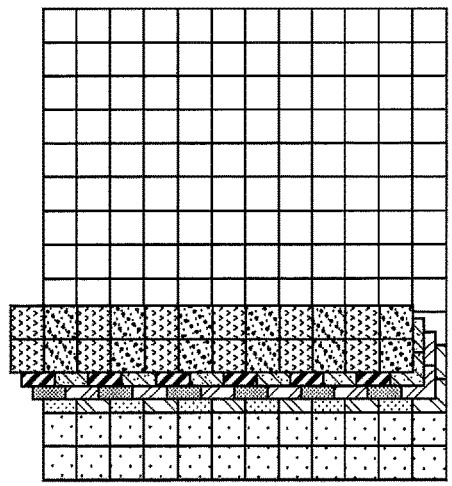

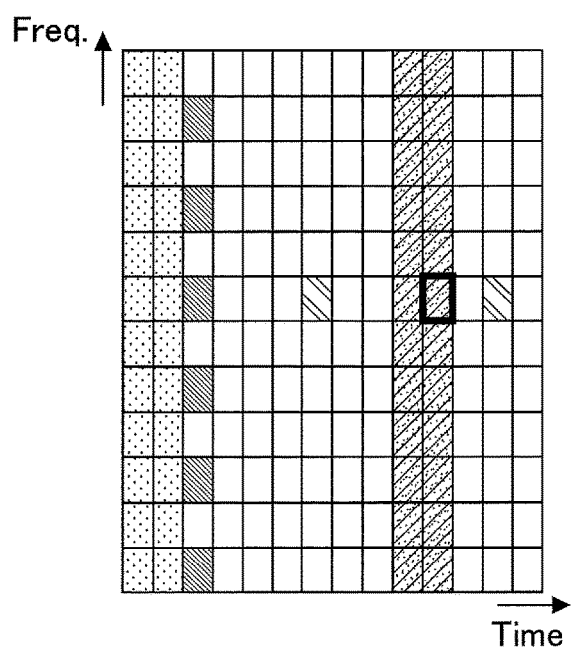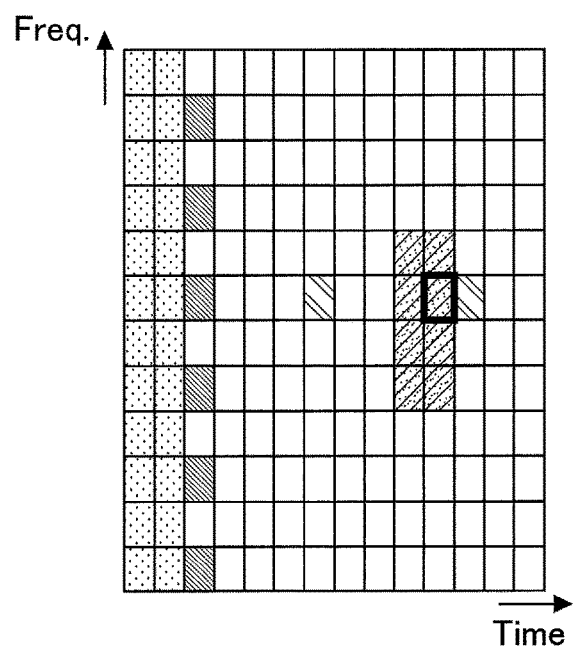
FIG.10

FIG.12
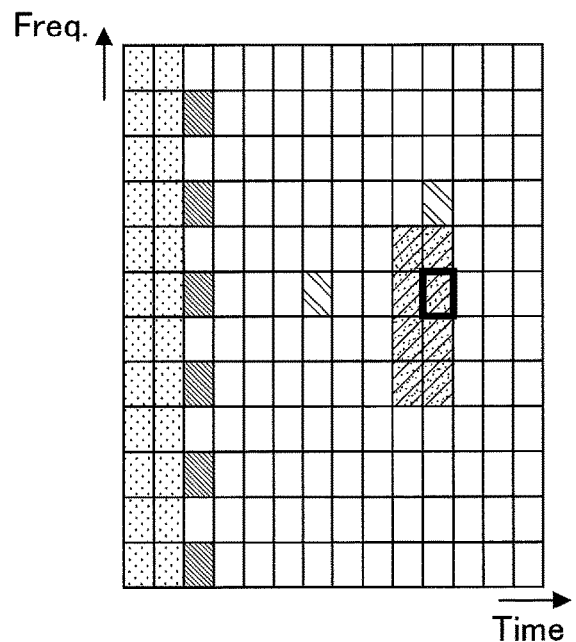
FIG.13
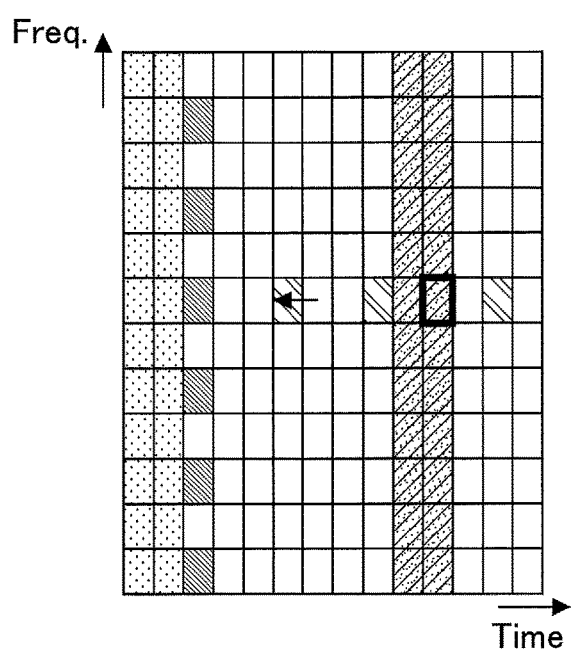 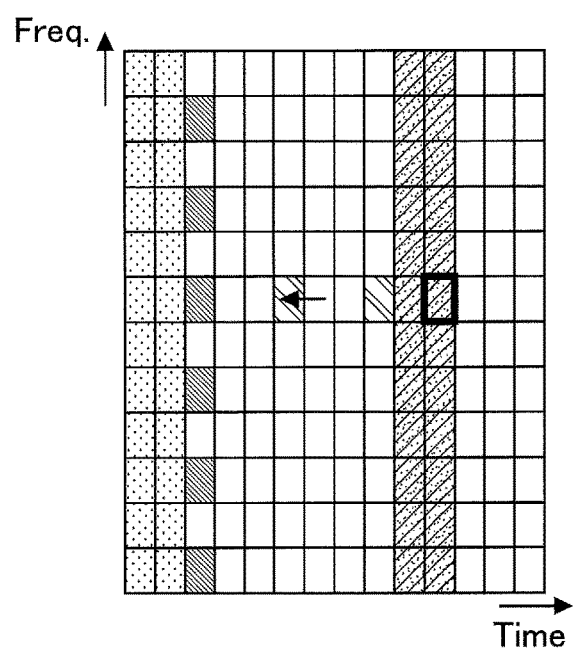

BASE STATION APPARATUS AND USER APPARATUS

TECHNICAL FIELD

The present invention relates to a base station apparatus and a user apparatus in a wireless communication system.

BACKGROUND ART

In 3rd Generation Partnership Project (3GPP), in order to implement further increase in system capacity, further increase in data transmission speed, further reduction in delay in a radio section, or the like, a wireless communication scheme called "5G" or "New Radio (NR)" (hereinafter the wireless communication scheme is referred to as "NR") is discussed. In NR, various wireless techniques are discussed in order to satisfy requirements to make delay in a radio section be 1 ms or less while achieving the throughput of 10 Gbps or more.

In NR, regarding a demodulation reference signal (DMRS), in order to reduce processing time required for channel estimation and signal demodulation, arranging the demodulation reference signal at a front position in a time domain within a slot is discussed. The demodulation reference signal arranged at the front position is referred to as a front-loaded DMRS (for example, Non-Patent Document 1).

In NR, introduction of a phase tracking reference signal (PTRS) which is a reference signal for phase fluctuation correction for reducing influence of phase noise or the like is discussed (for example, Non-Patent Document 2).

CITATION LIST

Non-Patent Document

Non-Patent Document 1: R1-1715261 WF on Remaining issues on DMRS, 3GPP TSG RAN WG1 Meeting #90 (Prague, Czech Republic, 21 to 25 Aug. 2017)
Non-Patent Document 2: R1-1715205 Summary of PTRS way forwards and offline discussions, 3GPP TSG RAN WG1 Meeting #90 (Prague, Czech Republic, 21 to 25 Aug. 2017)

SUMMARY OF THE INVENTION

Problem to be Solved by the Invention

In NR, it is necessary to appropriately arrange the PTRS in a radio frame while ensuring a required quality in consideration of the overlap with other reference signals and the overall overhead of the reference signal.

The present invention has been made in light of the foregoing, and it is an object of the present invention to improve phase noise correction accuracy by appropriately arranging the PTRS in a wireless communication system.

Means for Solving Problem

According to the technology of the disclosure, provided is a base station apparatus which performs communication with a user apparatus and includes a setting unit that arranges a reference signal used for phase correction in a radio frame at a predetermined interval and a transmitting unit that transmits the radio frame to the user apparatus, wherein, in a case in which the reference signal used for the phase correction is punctured in the radio frame, the reference signal used for the phase correction is arranged in a resource of the radio frame in which the reference signal used for the phase correction is arrangeable.

Effect of the Invention

According to the technology of the disclosure, it is possible to improve the phase noise correction accuracy by appropriately arranging the PTRS in the wireless communication system.

BRIEF DESCRIPTION OF DRAWINGS

FIG. 5 is a diagram illustrating an example in which a DMRS is arranged in a radio frame in an embodiment of the invention;
FIG. 10 is a diagram illustrating an example (2) in which an additional PTRS is arranged in a radio frame in a case in which a PTRS is punctured in an embodiment of the invention;
FIG. 12 is a diagram illustrating an example (4) in which an additional PTRS is arranged in a radio frame in a case in which a PTRS is punctured in an embodiment of the invention;
FIG. 13 is a diagram illustrating an example in which a PTRS is shifted and arranged in a radio frame in an embodiment of the invention.

MODE(S) FOR CARRYING OUT THE INVENTION

Hereinafter, an embodiment of the invention will be described with reference to the appended drawings. Note that the following is an example, and an embodiment to which the invention is applied is not limited to the following embodiment.

In an operation of a wireless communication system of the present embodiment, existing technology is appropriately used. Here, the existing technology is, for example, existing LTE but not limited to existing LTE. Further, the term "LTE" used in this specification shall have a broad meaning including LTE-Advanced and a scheme subsequent to LTE-Advanced (for example, NR) unless otherwise set forth herein.

Further, in an embodiment to be described below, terms such as a synchronization signal (SS), a primary SS (PSS), a secondary SS (SSS), a physical broadcast channel (PBCH), a physical RACH (PRACH), a physical downlink control channel (PDCCH), and a physical downlink shared channel (PDSCH) used in existing LTE are used for convenience of description, but signals, functions, or the like similar to them may be referred to as other names. Further, the above terms in NR correspond to an NR-SS, an NR-PSS, an NR-SSS, an NR-PBCH, an NR-PRACH, an NR-PDCCH, an NR-PDSCH, and the like.

Figure 1:
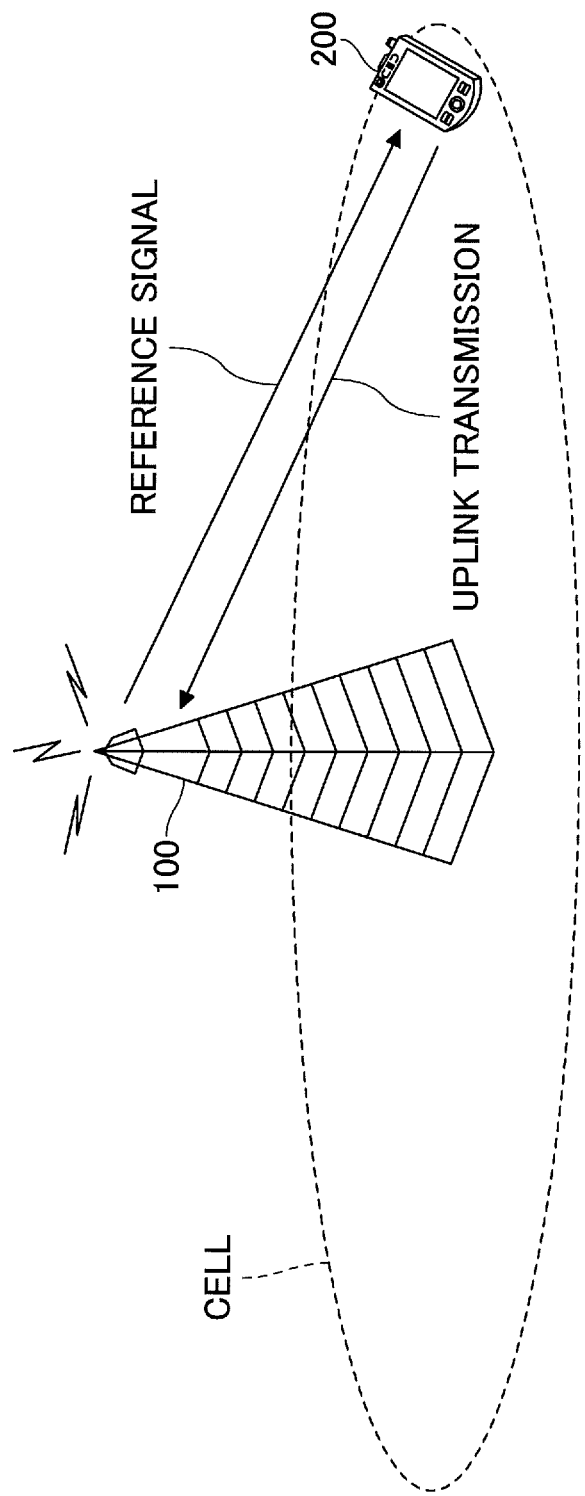
FIG. 1 is a diagram illustrating a configuration example of a wireless communication system in an embodiment of the invention.

FIG. 1 is a diagram illustrating a configuration example of a wireless communication system in an embodiment of the invention. The wireless communication system in the embodiment of the invention includes a base station apparatus 100 and a user apparatus 200 as illustrated in FIG. 1. A single base station apparatus 100 and a single user apparatus 200 are illustrated in FIG. 1, but this is an example, and the number of base station apparatuses 100 or the number of user apparatuses 200 may be two or more.

The base station apparatus 100 is a communication apparatus that provides one or more cells and performs wireless communication with the user apparatus 200. As illustrated in FIG. 1, the base station apparatus 100 transmits a reference signal to the user apparatus 200. The reference signal is arranged in a predetermined orthogonal frequency division multiplexing (OFDM) symbol on a radio frame in which a control signal and a data signal are arranged. Examples of the reference signal include a cell-specific reference signal (CRS), a demodulation reference signal (DMRS), a phase tracking reference signal (PTRS), and a channel status information-reference signal (CSI-RS). Both the base station apparatus 100 and the user apparatus 200 are capable of performing beamforming and performing transmission and reception of signals. The user apparatus 200 is a communication apparatus having a wireless communication function such as a smartphone, a mobile phone, a tablet, a wearable terminal, and a machine-to-machine (M2M) communication module, and is wirelessly connected to the base station apparatus 100 and uses various types of communication services provided by the wireless communication system. The user apparatus 200 performs downlink channel estimation and downlink signal modulation on the basis of the reference signal on the radio frame received from the base station apparatus 100.

Further, as illustrated in FIG. 1, uplink transmission is performed from the user apparatus 200 to the base station apparatus 100. The uplink transmission is performed through, for example, a physical uplink control channel (NR-PUCCH) or a physical uplink shared channel (NR-PUSCH), the control signal is transmitted through the NR-PUCCH, and the data and/or control signal is transmitted through the NR-PUSCH.

In the present embodiment, a duplex scheme may be a time division duplex (TDD) scheme, a frequency division duplex (FDD) scheme, or any other scheme (for example, a flexible duplex or the like).

Further, in the following description, transmitting a signal using a transmission beam may be performed by transmitting a signal which is multiplied by a precoding vector (which is precoded with a precoding vector). Similarly, receiving a signal using a reception beam may be performed by multiplying a received signal by a predetermined weight vector. Further, transmitting a signal using a transmission beam may be expressed as transmitting a signal through a specific antenna port. Similarly, receiving a signal using a reception beam may be expressed as receiving a signal through a particular antenna port. An antenna port refers to a logical antenna port or a physical antenna port defined in the 3GPP standard. A method of forming the transmission beam and the reception beam is not limited to the above method. For example, in the base station apparatus 100 and the user apparatus 200 having a plurality of antennas, a method of changing an angle of each antenna may be used, a method in which a method using a precoding vector and a method of changing an angle of an antenna are combined may be used, a method of switching and using different antenna panels may be used, a method of using a combination of a plurality of antenna panels may be used, or any other method may be used. Further, for example, a plurality of different transmission beams may be used in a high frequency band. Using a plurality of transmission beams is referred to as a multi-beam operation, and using a single transmission beam is referred to as a single beam operation.

Embodiment

An embodiment will be described below.

Figure 2:
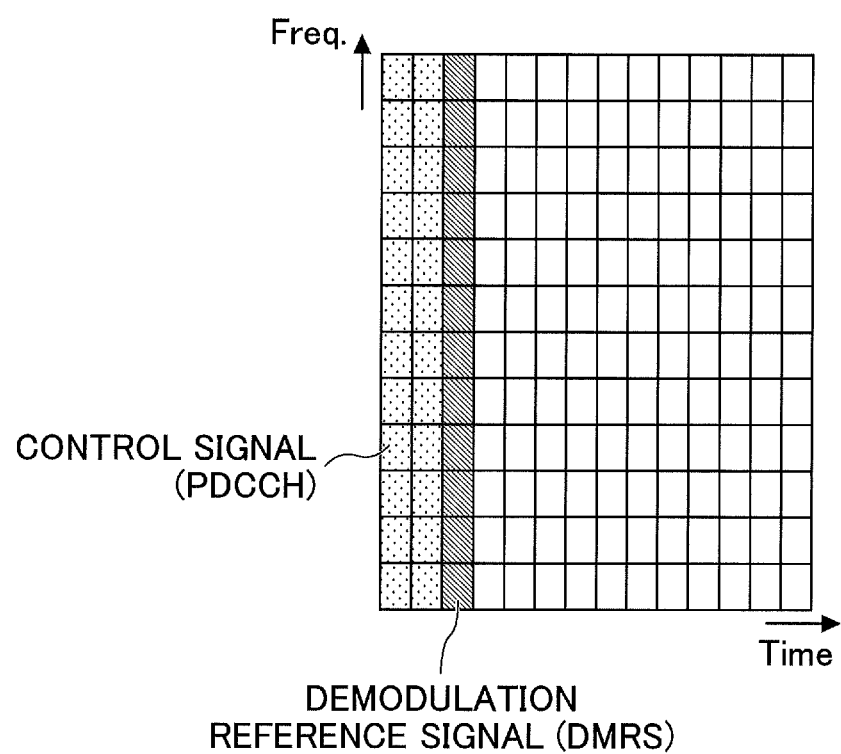
FIG. 2 is a diagram illustrating an example in which a control signal and a DMRS are arranged in a radio frame in an embodiment of the invention.

FIG. 2 is a diagram illustrating an example in which the control signal and the DMRS are arranged in a radio frame in an embodiment of the invention. In FIG. 2, one slot including 14 OFDM symbols is illustrated. In the example of the arrangement illustrated in FIG. 2, the control signal is arranged at two symbols at the beginning.

In NR, a technique of supporting a wide range of frequencies from a low carrier frequency to a high carrier frequency and satisfying various requirements is under review. In this regard, in order to reduce the processing time required for the channel estimation and the reception signal demodulation, the DMRS which is the demodulation reference signal is arranged in a third symbol from the beginning of the slot. In other words, the DMRS is arranged at the front position in the time domain of the slot. The DMRS arranged at the front position is referred to as a front-loaded DMRS.

Figure 3:
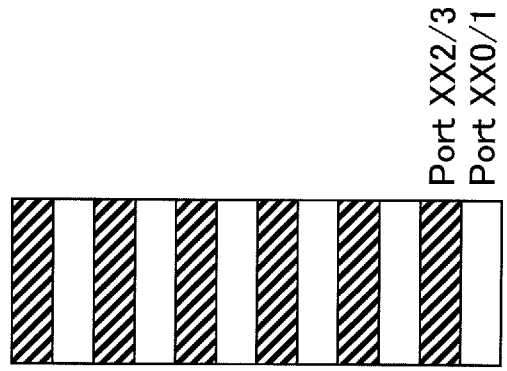
FIG. 3 is a diagram illustrating an example (1) in which a DMRS is mapped to an OFDM symbol in an embodiment of the invention.

FIG. 3 is a diagram illustrating an example (1) in which the DMRS is mapped to an OFDM symbol in an embodiment of the invention. A mapping format of the DMRS to the OFDM symbol in NR will be described. FIG. 3 illustrates mapping of the frequency domain for one OFDM symbol. Resources in a symbol are delimited in units of sub carriers, and 12 sub carriers are illustrated. In the example of mapping illustrated in FIG. 3, it is possible to arrange the DMRSs of up to 4 ports.

Indexes of ports are assumed to be "XX0," "XX1," "XX2," and "XX3" as in "Port indexing" illustrated in FIG. 3. A frequency offset of the DMRS is "0" in the case of "XX0" and "XX1" and "1" in the case of "XX2" and "XX3," as in "Frequency offset: delta" illustrated in FIG. 3, and in the mapping illustrated in FIG. 3, "XX0" or "XX1" is mapped to non-hatched resources, and "XX2" or "XX3" is mapped to shaded resources. A "frequency division orthogonal cover code (FD-OCC)" indicates an orthogonal code to be applied, and "+1" and "+1" in the case of "XX0,"

"+1" and "−1" in the case of "XX1," "+1" and "+1" in the case of "XX2," and "+1" and "−1" in the case of "XX3" are set as illustrated in FIG. 3

As illustrated in FIG. 3, for one OFDM symbol, the ports "XX0" and "XX1" are mapped for each resource in the frequency domain, and "XX2" and "XX3" are mapped to non-mapped resources for each resource in the frequency domain.

Figure 4:
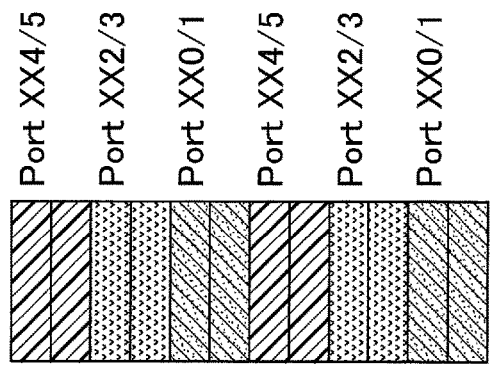
FIG. 4 is a diagram illustrating an example (2) in which a DMRS is mapped to an OFDM symbol in an embodiment of the invention.

FIG. 4 is a diagram illustrating an example (2) in which the DMRS is mapped to the OFDM symbol in an embodiment of the invention. A mapping format of the DMRS to the OFDM symbol in NR will be described. FIG. 4 illustrates mapping of the frequency domain for one OFDM symbol. Resources in a symbol are delimited in units of sub carriers, and 12 sub carriers are illustrated. In the example of mapping illustrated in FIG. 4, it is possible to arrange the DMRSs of up to 6 ports.

Indexes of ports are assumed to be "XX0," "XX1," "XX2," "XX3," "XX4," and "XX5" as in "Port indexing" illustrated in FIG. 4. A frequency offset of the DMRS is "0" in the case of "XX0" and "XX1," "2" in the case of "XX2" and "XX3," and "4" in the case of "XX4" and "XX5" as in "Frequency offset: delta" illustrated in FIG. 4. In the mapping illustrated in FIG. 4, in the frequency domain, "XX0" or "XX1" is mapped to two resources, "XX2" or "XX3" is mapped to next two resources, and "XX4" or "XX5" is mapped to further next two resources. "FD-OCC" indicates an orthogonal code to be applied, and "+1" and "+1" in the case of "XX0," "+1" and "−1" in the case of "XX1," "+1" and "+1" in the case of "XX2," "+1" and "−1" in the case of "XX3," "+1" and "+1" in the case of "XX4," and "+1" and "−1" in the case of "XX5" are set as illustrated in FIG. 4

As illustrated in FIG. 4, for one OFDM symbol, the ports "XX0" to "XX5" are mapped to six resources in the frequency domain, and "XX0" to "XX5" are repeatedly mapped to next six resources.

FIG. 5 is a diagram illustrating an example in which the DMRS is arranged in the radio frame in an embodiment of the invention. An example in which the front-loaded DMRS is arranged in the radio frame will be described with reference to FIG. 5. The radio frame illustrated in FIG. 5 illustrates one slot including 14 OFDM symbols, a horizontal axis corresponds to the time domain, a vertical axis corresponds to the frequency domain, the resource of the frequency domain is delimited in units of sub carriers, and 12 sub carriers are illustrated. Note that the indexes of the ports are an example, and different indexes may be assigned.

In "Configuration type 1" illustrated in FIG. 5, in a case in which it is mapped to one OFDM symbol, it is possible to arrange the front-loaded DMRSs of up to 4 ports. Ports are repeatedly arranged in order in 12 resources of the frequency domain in a third symbol from the beginning in such a way that Port #0 and Port #1 are arranged in a first resource, and Port #2 and Port #3 are arranged in a second resource. Ports #0 and #1 and Ports #2 and #3 are multiplexed by the FD-OCC (cyclic shift (CS)).

In "Configuration type 1" illustrated in FIG. 5, in a case in which it is mapped to two OFDM symbols, it is possible to arrange the front-loaded DMRSs of up to 8 ports. Ports are repeatedly arranged in order in 12 resources of the frequency domain in third and fourth symbols from the beginning in such a way that Ports #0, #1, #4, and #6 are arranged in a first resource, and Ports #2, #3, #5, and #7 are arranged in a second resource. Ports #0, #1, #4, and #6 and Ports #2, #3, #5, and #7 are multiplexed by the FD-OCC and/or a time division (TD)-OCC.

In "Configuration type 2" illustrated in FIG. 5, in a case in which it is mapped to one OFDM symbol, it is possible to arrange the front-loaded DMRSs of 6 ports. Ports are repeatedly arranged in order in 12 resources of the frequency domain in a third symbol from the beginning in such a way that Port #0 and Port #1 are arranged in first and second resources, Port #2 and Port #3 are arranged in third and fourth resources, and Port #4 and Port #5 are arranged in fifth and sixth resources. Ports #0 and #1, Ports #2 and #3, and Ports #4 and #5 are multiplexed by the FD-OCC (CS).

In "Configuration type 2" illustrated in FIG. 5, in a case in which it is mapped to two OFDM symbols, it is possible to arrange the front-loaded DMRSs of up to 12 ports. Ports are repeatedly arranged in order in 12 resources of the frequency domain in third and fourth symbols from the beginning in such a way that Ports #0, #1, #6, and #7 are arranged in first and second resources, Ports #2, #3, #8, and #9 are arranged in third and fourth resources, and Ports #4, #5, #10, and #11 are arranged. Ports #0, #1, #6, and #7, Ports #2, #3, #8, and #9, and Ports #4, #5, #10, and #11 are multiplexed by the FD-OCC and/or the TD-OCC.

Figure 6:
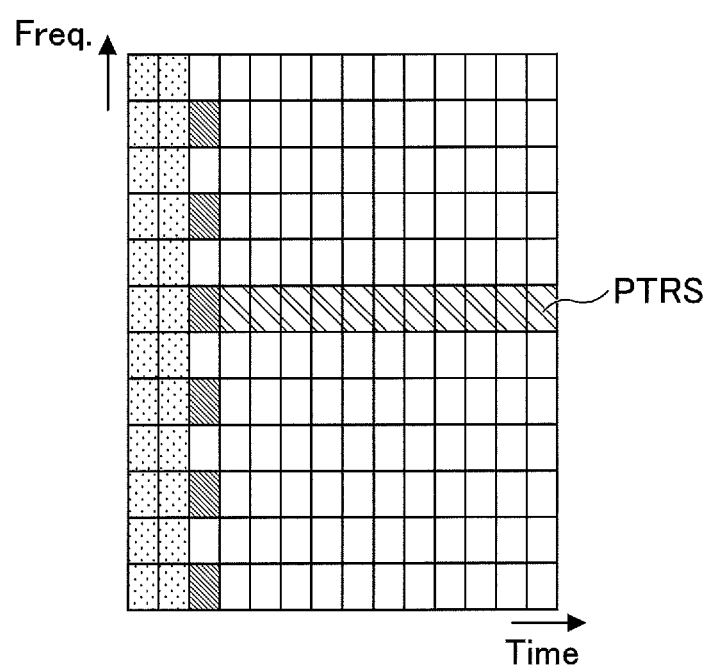
FIG. 6 is a diagram illustrating an example (1) in a PTRS is arranged in a radio frame in an embodiment of the invention.

FIG. 6 is a diagram illustrating an example (1) in which the PTRS is arranged in the radio frame in an embodiment of the invention. FIG. 6 illustrates one slot including 14 OFDM symbols. In the example of the arrangement illustrated in FIG. 6, the control signal is arranged in two symbols at the beginning, and the front-loaded DMRS is arranged in a third symbol from the beginning for each sub carrier.

The PTRS is introduced to alleviate the influence of the phase noise and the like. The influence of the phase noise varies depending on a carrier frequency and a modulation scheme. The influence is relatively small in a modulation scheme with a low carrier frequency and a low transfer rate, and the influence relatively increases as the carrier frequency is higher and the transfer rate of the modulation scheme increases. FIG. 6 illustrates an example in which the PTRS is continuously arranged in fourth to fourteenth symbols from the beginning, and the frequency domain is arranged in a seventh sub carrier in order to reduce the influence.

Figure 7:
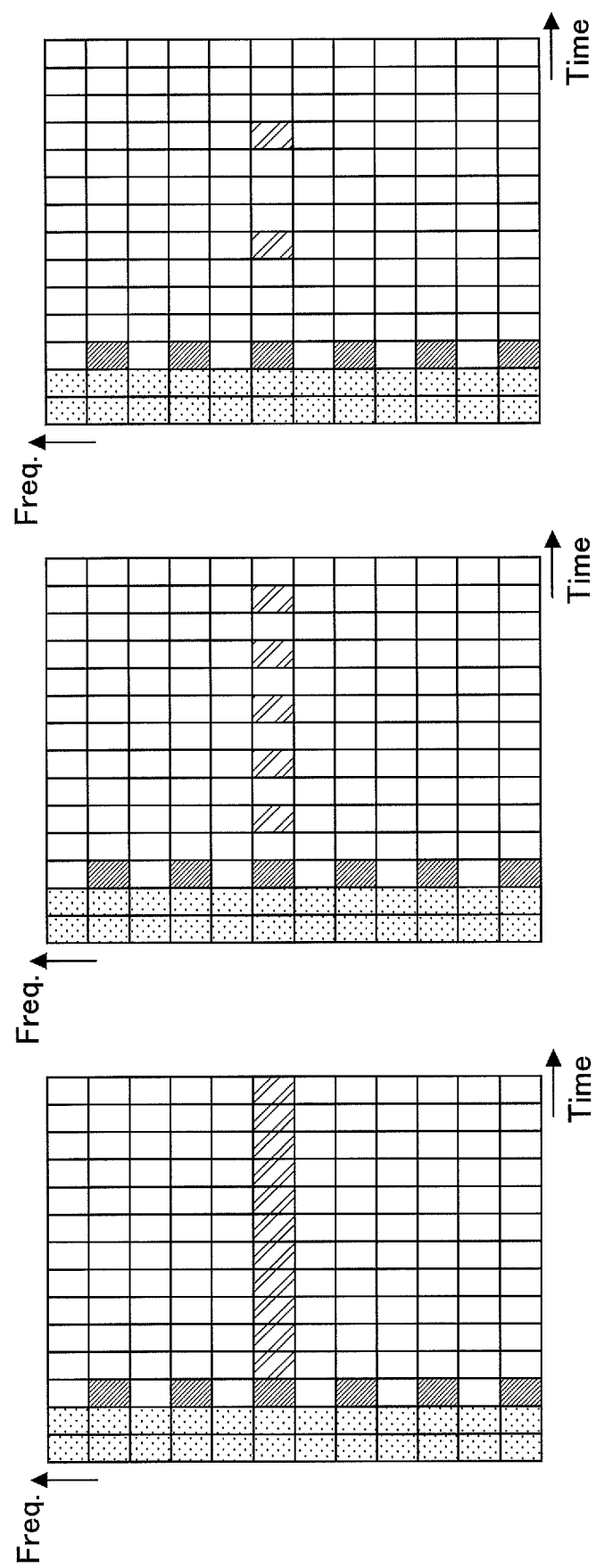
FIG. 7 is a diagram illustrating an example (2) in which a PTRS is arranged in a radio frame in an embodiment of the invention.

FIG. 7 is a diagram illustrating an example (2) in which the PTRS is arranged in the radio frame in an embodiment of the invention. FIG. 7 illustrates one slot including 14 OFDM symbols. In the example of the arrangement illustrated in FIG. 7, the control signal is arranged in two symbols at the beginning, and the front-loaded DMRS is arranged in a third symbol from the beginning for each sub carrier.

FIG. 7 illustrates three arrangement examples which differ in insertion density in the time domain of PTRS. In the leftmost drawing, the PTRS is arranged in all of fourth to fourteenth symbols from the beginning. In the middle drawing, the PTRS is arranged in fifth to thirteenth symbols from the beginning for every two symbols. In the rightmost drawing, the PTRS is arranged in a seventh symbol from the beginning for every four symbols. In the modulation scheme with a high transfer rate, the insertion density may be high, and in the modulation scheme with a low transfer rate, the insertion density may be low. In other words, the arrangement of the PTRS illustrated in the leftmost drawing may be used in the modulation scheme with a high transfer rate, and the arrangement of the PTRS illustrated in the rightmost drawing may be used in the modulation scheme with a low transfer rate.

Figure 8:
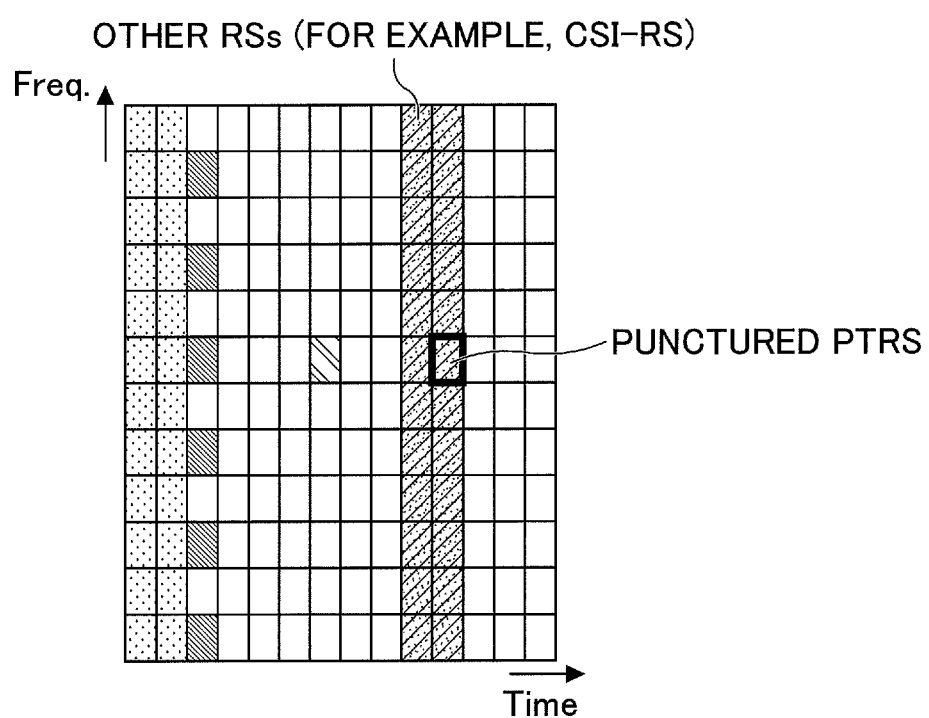
FIG. 8 is a diagram illustrating an example in which a PTRS is punctured in an embodiment of the invention.

FIG. 8 is a diagram illustrating an example in which the PTRS is punctured in the embodiment of the invention. FIG.

8 illustrates one slot including 14 OFDM symbols. In the example of the arrangement illustrated in FIG. 8, the control signal is arranged in two symbols at the beginning, and the front-loaded DMRS is arranged in a third symbol from the beginning for each sub carrier. Further, other RSs are arranged in a tenth symbol and an eleventh symbol from the beginning.

FIG. 8 illustrates an arrangement example in a case in which the resource in which the PTRS is arranged overlaps with resources of other RSs (for example, the CSI-RS). FIG. 8 illustrates an arrangement in which the PTRS is punctured because it overlaps with other RSs in a case in which the PTRS is arranged in the seventh symbol from the beginning and the PTRS is arranged for every four symbols.

Here, since the PTRS is punctured, the insertion interval of the PTRS increases, the insertion density decreases, and the phase noise correction accuracy by the PTRS deteriorates. Therefore, the required quality is likely to be unable to be satisfied.

In a case in which the PTRS is associated with the DMRS of a certain port, and a required insertion interval of the PTRS is every four symbols, the first PTRS may be arranged in a fourth symbol counted from the front-loaded DMRS. In other words, the first PTRS may be inserted at the required insertion interval in which counting starts from the front-loaded DMRS. Further, the PTRS may be arranged in a sub carrier in which the front-loaded DMRS of a specific port associated with the PTRS is arranged. In other words, in FIG. 8, the front-loaded DMRS of a specific port arranged in the seventh sub carrier may be associated with the PTRS.

Figure 9:
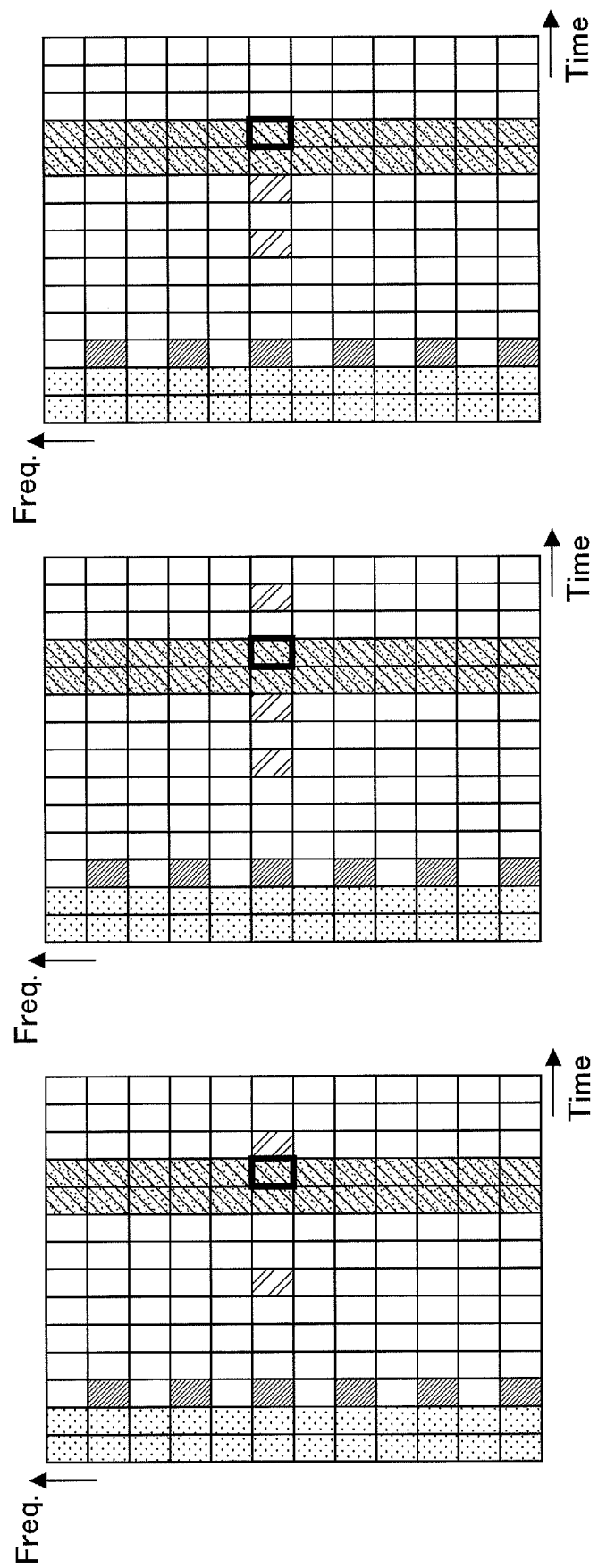
FIG. 9 is a diagram illustrating an example (1) in which an additional PTRS is arranged in a radio frame in a case in which a PTRS is punctured in an embodiment of the invention.

FIG. 9 is a diagram illustrating an example (1) in which an additional PTRS is arranged in the radio frame in a case in which the PTRS is punctured in an embodiment of the invention. FIG. 9 illustrates one slot including 14 OFDM symbols. In the example of the arrangement illustrated in FIG. 9, the control signal is arranged in two symbols at the beginning, and the front-loaded DMRS is arranged in a third symbol from the beginning for each sub carrier. Further, other RSs are arranged in a tenth symbol and an eleventh symbol from the beginning. FIG. 9 illustrates an example in which the required insertion interval of the PTRS is every four symbols.

The leftmost drawing illustrates an arrangement example in which the PTRS is inserted in a symbol at the rear position in the time domain since the PTRS of an eleventh symbol from the beginning is punctured. In this arrangement, the PTRS is arranged in the seventh symbol and the twelfth symbol from the beginning.

The middle drawing illustrates an example in which since the PTRS of an eleventh symbol from the beginning is punctured, the PTRS is inserted in a symbol at the front position in the time domain, and in symbols subsequent thereto, symbols including no data are also counted and arranged for every four symbols of a required interval. In this arrangement, the PTRS is arranged in a seventh symbol, a ninth symbol, and a thirteenth symbol from the beginning.

The rightmost drawing illustrates an example in which since the PTRS of an eleventh symbol from the beginning is punctured, the PTRS is inserted in a symbol at the front position in the time domain, and in symbols subsequent thereto, only symbols including data are counted and arranged for every four symbols of a required interval. In this arrangement, the PTRS is arranged in a seventh symbol and a ninth symbol from the beginning. The PTRS next to that of the ninth symbol has to be arranged in a fifteenth symbol, but it is not arranged since it is not included within one slot.

With the PTRS arrangement described above, the PTRS can be mapped again from the symbol behind or ahead of the symbol of the punctured PTRS so that the insertion interval is equal to or closest to the required insertion interval.

FIG. 10 is a diagram illustrating an example (2) in which an additional PTRS is arranged in the radio frame in a case in which the PTRS is punctured in an embodiment of the invention. FIG. 10 illustrates one slot including 14 OFDM symbols. In the example of the arrangement illustrated in FIG. 10, the control signal is arranged in two symbols at the beginning, and the front-loaded DMRS is arranged in a third symbol from the beginning for each sub carrier. Further, other RSs are arranged in a tenth symbol and an eleventh symbol from the beginning. FIG. 10 illustrates an example in which the required insertion interval of the PTRS is every four symbols.

The left drawing illustrates an arrangement example in which, in a case in which the PTRS is punctured, only symbols including data are counted, and the PTRS is inserted for every four symbols. In this arrangement, the PTRS is arranged in a seventh symbol and a thirteenth symbol from the beginning. Data is included in an eighth symbol, a ninth symbol, and a twelfth symbol from the beginning.

The right drawing illustrates an arrangement example in which, in a case in which the symbol including another RS overlapping the punctured PTRS includes data, the symbol is also counted, and the PTRS is arranged for every four symbols so that the interval is closest to the required interval. In this arrangement, the PTRS is arranged in a seventh symbol and a twelfth symbol from the beginning. In a case in which a symbol at the front position in the time domain is used, since it is a ninth symbol from the beginning, and it is far from an eleventh symbol which is punctured, the PTRS is arranged in a twelfth symbol.

With the above PTRS arrangement, the PTRS can be mapped so that the insertion interval is equal to or closest to the required insertion interval.

Further, when the PTRS is mapped so that the interval is equal to or closest to the required insertion interval, mapping at an interval larger than the required interval may not be allowed, that is, mapping may be performed so that the interval is consistently smaller than the required interval. Accordingly, it is possible to prevent the deterioration in the phase noise correction accuracy.

Figure 11:
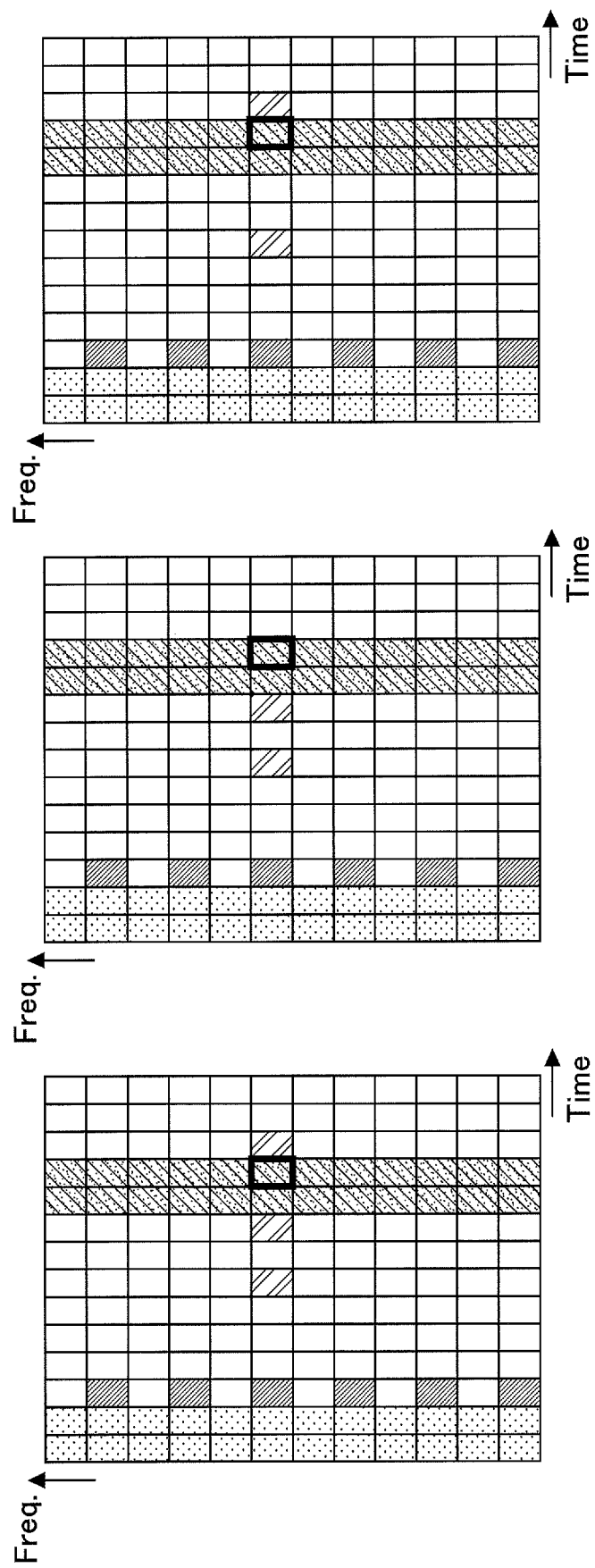
FIG. 11 is a diagram illustrating an example (3) in which an additional PTRS is arranged in a radio frame in a case in which a PTRS is punctured in an embodiment of the invention.

FIG. 11 is a diagram illustrating an example (3) in which an additional PTRS is arranged in the radio frame in a case in which the PTRS is punctured in an embodiment of the invention. FIG. 11 illustrates one slot including 14 OFDM symbols. In the example of the arrangement illustrated in FIG. 11, the control signal is arranged in two symbols at the beginning, and the front-loaded DMRS is arranged in a third symbol from the beginning for each sub carrier. Further, other RSs are arranged in a tenth symbol and an eleventh symbol from the beginning. FIG. 11 illustrates an example in which the required insertion interval of the PTRS is every four symbols.

The leftmost drawing illustrates an arrangement example in which an additional PTRS is mapped before and after the symbol in which the PTRS is punctured in the time domain. In this arrangement, the PTRS is arranged in a seventh symbol, a ninth symbol, and an eleventh symbol from the beginning.

The middle drawing illustrates an arrangement example in which an additional PTRS is mapped only before the symbol in which the PTRS is punctured in the time domain. In this arrangement, the PTRS is arranged in a seventh symbol and a ninth symbol from the beginning. The PTRS next to the PTRS in the ninth symbol from the beginning has to be arranged in a fifteenth symbol, but it is not arranged since it is not included within one slot.

The rightmost drawing illustrates an arrangement example in which an additional PTRS is mapped only after the symbol in which the PTRS is punctured in the time domain. In this arrangement, the PTRS is arranged in a seventh symbol and a twelfth symbol from the beginning.

In the above PTRS arrangement, in a case in which the additional PTRS is inserted either before or after the symbol in which the PTRS is punctured in the time domain, the insertion may be performed so that it is close to the required interval. For example, in the example of FIG. 11, the PTRS may be inserted only at the rear position. With this insertion, it is possible to implement the arrangement in which the interval is close to the required insertion interval.

FIG. 12 is a diagram illustrating an example (4) in which an additional PTRS is arranged in the radio frame in a case in which the PTRS is punctured in an embodiment of the invention. FIG. 12 illustrates one slot including 14 OFDM symbols. In the example of the arrangement illustrated in FIG. 12, the control signal is arranged in two symbols at the beginning, and the front-loaded DMRS is arranged in a third symbol from the beginning for each sub carrier. Further, other RSs are arranged in a tenth symbol and an eleventh symbol from the beginning. FIG. 12 illustrates an example in which the required insertion interval of the PTRS is every four symbols.

FIG. 12 illustrates an arrangement example in which, in a case in which data is included in the symbol in which the PTRS is punctured, an additional PTRS is mapped to a sub carrier including the closest data in the frequency domain. As illustrated in FIG. 12, in this arrangement, the PTRS is arranged in a seventh symbol from the beginning and an eleventh symbol and a second sub carrier on a higher frequency side from a sub carrier of the punctured PTRS. A low frequency side is a third sub carrier and is far away, and thus it is not arranged.

Here, the PTRS may be arranged to satisfy that it is mapped to the same sub carrier as the associated DMRS port. In other words, in the arrangement example of FIG. 12, only in a case in which the front-loaded DMRS of the associated port is arranged in the second sub carrier on the high frequency side from the sub carrier of the punctured PTRS, the additional PTRS may be arranged in the sub carrier.

FIG. 13 is a diagram illustrating an example in which the PTRS is shifted and arranged in the radio frame in an embodiment of the invention. FIG. 13 illustrates one slot including 14 OFDM symbols. In the example of the arrangement illustrated in FIG. 13, the control signal is arranged in two symbols at the beginning, and the front-loaded DMRS is arranged in a third symbol from the beginning for each sub carrier. Further, other RSs are arranged in a tenth symbol and an eleventh symbol from the beginning. FIG. 13 illustrates an example in which the required insertion interval of the PTRS is every four symbols.

The left drawing illustrates an arrangement example in which an additional PTRS is inserted in a symbol before the symbol in which the PTRS is punctured in the time domain, the symbol including no data is also counted so that it becomes the required insertion interval, the PTRS is mapped, and an already arranged PTRS is shifted in the front direction by one symbol. In this arrangement, the PTRS is arranged in a sixth symbol, a ninth symbol, and a thirteenth symbol from the beginning.

The right drawing illustrates an arrangement example in which an additional PTRS is inserted in a symbol before the symbol in which the PTRS is punctured in the time domain, only the symbol including data is counted so that it becomes the required insertion interval, the PTRS is mapped, and an already arranged PTRS is shifted in the front direction by one symbol. In this arrangement, the PTRS is arranged in a sixth symbol and a ninth symbol from the beginning. The PTRS next to that of the ninth symbol has to be arranged in a fifteenth symbol but is not included within one slot, and thus it is not arranged.

In the above PTRS arrangement, since the interval at which the PTRS is inserted is closer to an equal interval, smoothing of the phase noise correction accuracy can be implemented.

According to the above-described embodiment, it is possible to implement the method of mapping the PTRS with a suitable insertion interval. Further, the base station apparatus 100 and the user apparatus 200 may adjust the PTRS insertion interval and perform transmission by a predefined method. Further, the PTRS insertion interval adjustment in the above-described embodiment may be similarly applied to downlink and uplink. Further, the base station apparatus 100 and the user apparatus 200 may perform the reception process while assuming the reception signal to which the PTRS insertion interval adjustment in the above-described embodiment is applied. By implementing the mapping of the PTRS close to the required insertion interval implicitly as in the above-described embodiment, it is possible to improve the phase noise correction accuracy without increasing the signaling overhead.

Note that the methods described in the above embodiment may be combined and applied. Further, any of the methods described in the above embodiment may be explicitly set or notified by high layer signaling, and the mapping of the PTRS may be specified by the corresponding method.

The size of the PDCCH is not limited to two symbols. The size of the PDCCH may be zero symbol, one symbol, or three symbols or may be inserted into some sub carriers within the symbol.

The insertion position of the front-loaded DMRS is not limited to the third symbol. The insertion position of the front-loaded DMRS may be the fourth symbol, may be the first symbol of the PUSCH in an uplink signal, or the second symbol of the PUSCH. Further, the number of symbols of the front-loaded DMRS is not limited to one. The front-loaded DMRS may be two symbols, may be arranged in the third and fourth symbols, may be arranged in the fourth symbol and the fifth symbol, may be arranged in the first and second symbols of the PUSCH in the uplink signal, or may be arranged in the second symbol and the third symbol of the PUSCH.

The DMRS is also referred to as a demodulation RS. As the DMRS, only the front-loaded DMRS may be arranged, or another additional DMRS may be further arranged in the slot.

The number of symbols in one slot is not limited to 14. Any one value from one symbol to 13 symbols may be taken. Further, in a case in which it is not 14 symbols, it is also referred to as a minislot.

A downlink data channel is also referred to as a PDSCH. An uplink data channel is also referred to as a PUSCH. A downlink control channel is also referred to as a PDCCH. An uplink control channel is also referred to as a PUCCH.

In the above-described embodiment, the base station apparatus 100 and the user apparatus 200 can implicitly implement the mapping of the PTRS close to the required insertion interval, and thus it is possible to improve the phase noise correction accuracy on the reception side apparatus without increasing the signaling overhead.

In other words, in the wireless communication system, the PTRS is appropriately arranged, and thus it is possible to prevent the signaling overhead from becoming excessive and to improve the phase noise correction accuracy.

(Apparatus configuration) Next, a functional configuration example of each of the base station apparatus 100 and the user apparatus 200 that execute the processes and the operation described so far will be described. Each of the base station apparatus 100 and the user apparatus 200 has at least the function of implementing the embodiment. Here, each of the base station apparatus 100 and the user apparatus 200 may have only some of the functions in the embodiment.

Figure 14:
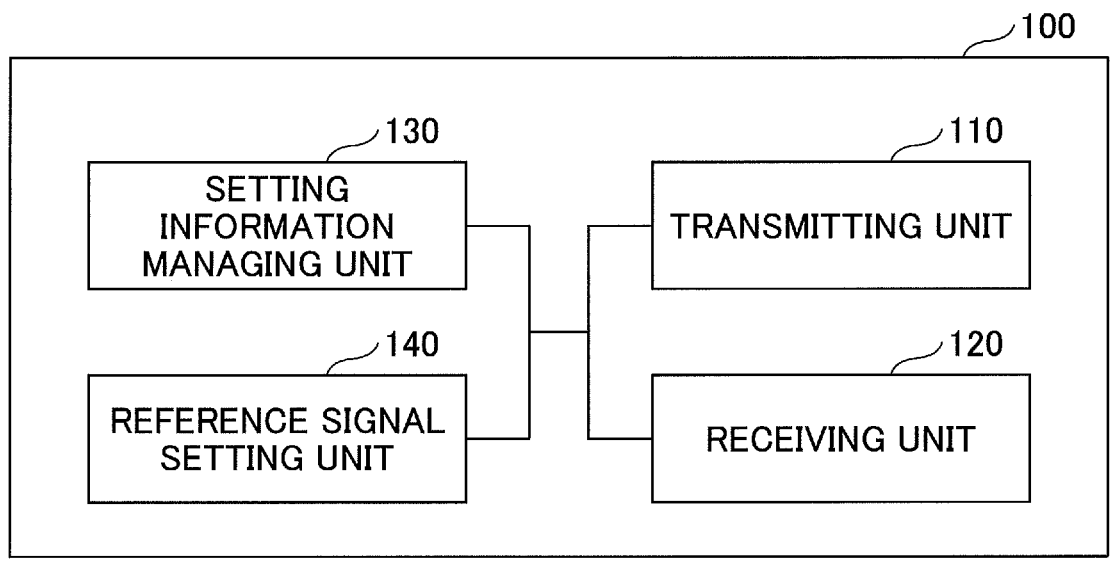
FIG. 14 is a diagram illustrating an example of a functional configuration of a base station apparatus 100 in an embodiment of the invention.

FIG. 14 is a diagram illustrating an example of a functional configuration of the base station apparatus 100. As illustrated in FIG. 14, the base station apparatus 100 has a transmitting unit 110, a receiving unit 120, a setting information managing unit 130, and a reference signal setting unit 140. The functional configuration illustrated in FIG. 14 is only an example. As long as the operation according to the embodiment of the invention can be executed, the function classification and the name of the function unit are not consequential.

The transmitting unit 110 has a function of generating a signal to be transmitted to the user apparatus 200 and transmitting the signal wirelessly. The receiving unit 120 has a function of receiving various types of signals transmitted from the user apparatus 200 and acquiring, for example, information of a higher layer from the received signals. The transmitting unit 110 also has a function of transmitting the NR-PSS, the NR-SSS, the NR-PBCH, the NR-PDCCH, the NR-PDSCH, or the like to the user apparatus 200. Further, the transmitting unit 110 transmits various types of reference signals, for example, the DMRS, the PTRS, or the like to the user apparatus 200.

The setting information managing unit 130 stores preset setting information and various types of setting information to be transmitted to the user apparatus 200. For example, content of the setting information is information related to the arrangement of the reference signal in the radio frame.

The reference signal setting unit 140 sets various types of reference signals to be transmitted from the base station apparatus 100 to the user apparatus 200, for example, the DMRS, the PTRS, or the like, in the radio frame as described in the embodiment.

Figure 15:
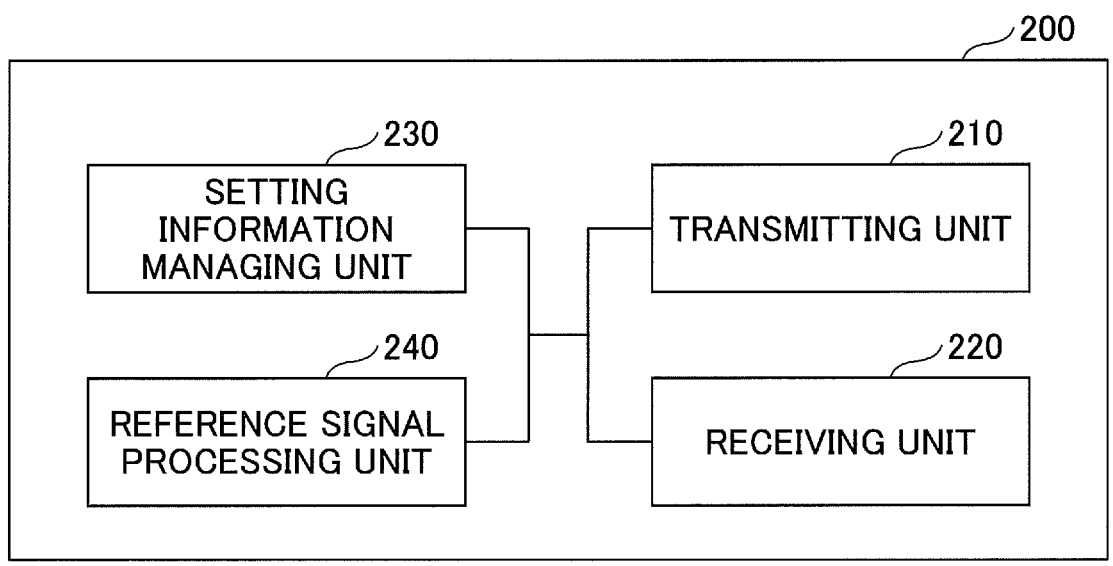
FIG. 15 is a diagram illustrating an example of a functional configuration of a user apparatus 200 in an embodiment of the invention.

FIG. 15 is a diagram illustrating an example of a functional configuration of the user apparatus 200. As illustrated in FIG. 15, the user apparatus 200 has a transmitting unit 210, a receiving unit 220, a setting information managing unit 230, and a reference signal processing unit 240. The functional configuration illustrated in FIG. 15 is only an example. As long as the operation according to the embodiment of the invention can be executed, the function classification and the name of the function unit are not consequential.

The transmitting unit 210 generates a transmission signal from transmission data and transmits the transmission signal wirelessly. The receiving unit 220 wirelessly receives various types of signals, and acquires a signal of a higher layer from a received signal of a physical layer. The receiving unit 220 also has a function of receiving the NR-PSS, the NR-SSS, the NR-PBCH, the NR-PDCCH, the NR-PDSCH, or the like transmitted from the base station apparatus 100. Further, the transmitting unit 210 transmits an uplink signal to the base station apparatus 100, and the receiving unit 120 receives various types of reference signals, for example, the DMRS, the PTRS, or the like from the base station apparatus 100. The setting information managing unit 230 stores various types of setting information received from the base station apparatus 100 by the receiving unit 220. The setting information managing unit 230 also stores preset setting information. For example, content of the setting information is information related to the arrangement of the reference signal in the radio frame.

The reference signal processing unit 240 performs control related to an operation of receiving the reference signal in the user apparatus 200 described in the embodiment and using the reference signal for the channel estimation and the demodulation or the like. The function unit related to the reception of the reference signal in the reference signal processing unit 240 may be included in the receiving unit 220.

(Hardware Configuration)

In the functional configuration diagrams (FIGS. 14 and 15) used for the description of the embodiment of the invention, the blocks of the functional units are illustrated. The functional blocks (configuring units) are implemented by an arbitrary combination of hardware and/or software. A device of implementing each functional block is not particularly limited. In other words, each functional block may be implemented by one device in which a plurality of elements are physically and/or logically combined or may be implemented by a plurality of devices, that is, two or more devices which are physically and/or logically separated and are directly and/or indirectly connected (for example, in a wired and/or wireless manner).

Figure 16:
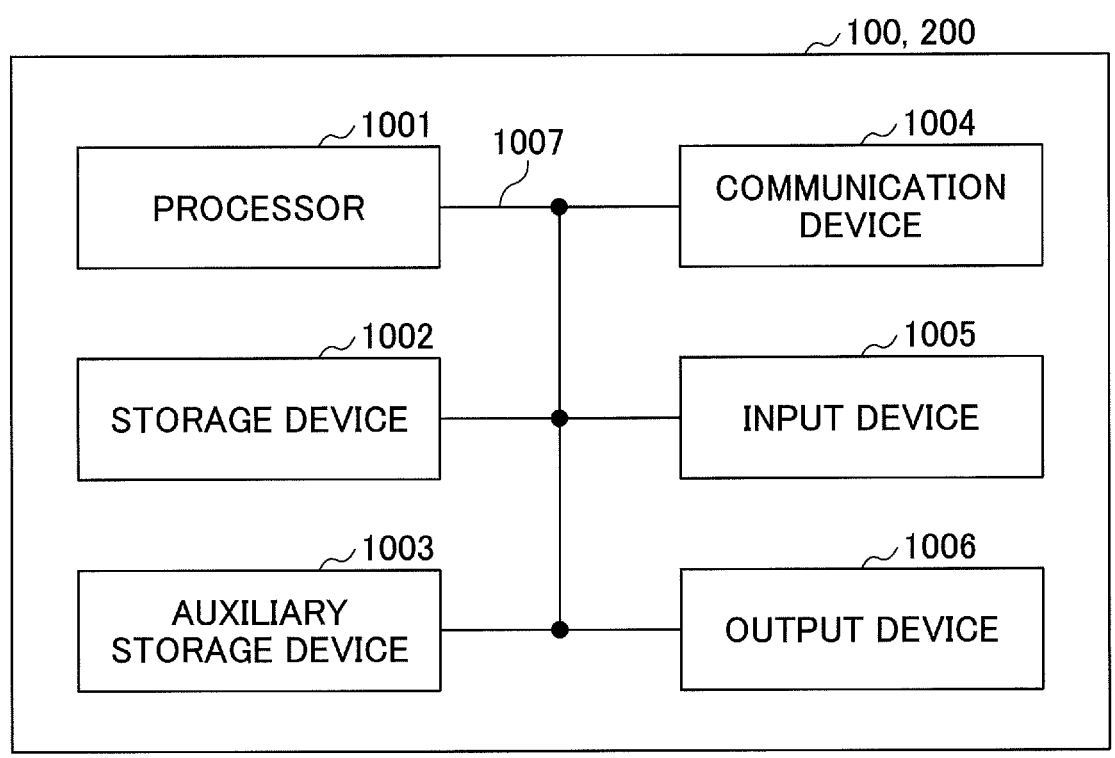
FIG. 16 is a diagram illustrating an example of a hardware configuration of each of a base station apparatus 100 and a user apparatus 200 in an embodiment of the invention.

Further, for example, both the base station apparatus 100 and the user apparatus 200 in one embodiment of the invention may function as a computer that performs the process according to the embodiment of the invention. FIG. 16 is a diagram illustrating an example of a hardware configuration of a wireless communication apparatus which is the base station apparatus 100 or the user apparatus 200 according to the embodiment of the invention. Each of the base station apparatus 100 and the user apparatus 200 may be physically configured as a computer device including a processor 1001, a storage device 1002, an auxiliary storage device 1003, a communication device 1004, an input device 1005, an output device 1006, a bus 1007, and the like.

In the following description, the term "apparatus" can be read as a circuit, device, unit, or the like. The hardware configuration of each of the base station apparatus 100 and the user apparatus 200 may be configured to include one or more devices indicated by 1001 to 1006 illustrated in the drawing or may be configured without including some devices.

Each function in each of the base station apparatus 100 and the user apparatus 200 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like.

Further, the processor 1001 reads a program (program code), a software module, or data from the auxiliary storage device 1003 and/or the communication device 1004 out to the storage device 1002, and executes various types of processes according to them. A program causing a computer to execute at least some of the operations described in the above embodiment is used as the program. For example, the transmitting unit 110, the receiving unit 120, the setting information managing unit 130, and the reference signal setting unit 140 of the base station apparatus 100 illustrated in FIG. 14 may be implemented by a control program which is stored in the storage device 1002 and operates on the processor 1001. Further, for example, the transmitting unit 210, the receiving unit 220, the setting information managing unit 230, and the reference signal processing unit 240 of the user apparatus 200 illustrated in FIG. 15 may be implemented by a control program which is stored in the storage device 1002 and operates on the processor 1001. Various types of processes have been described as being performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and may be configured with, for example, at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the process according to an embodiment of the present embodiment.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or Blu-ray (registered trademark) disc, a smart card, a flash memory (for example, a card, a stick, or a key drive), a floppy (registered trademark) disk, a magnetic strip, and the like. The auxiliary storage device 1003 is also referred to as an "auxiliary storage device." The storage medium may be, for example, a database, a server, or any other appropriate medium including the storage device 1002 and/or the auxiliary storage device 1003.

The communication device 1004 is hardware (a transceiving device) for performing communication between computers via a wired and/or wireless network and is also referred to as a "network device," a "network controller," a "network card," a "communication module," or the like. For example, the transmitting unit 110 and the receiving unit 120 of the base station apparatus 100 may be implemented in the communication device 1004. Further, the transmitting unit 210 and the receiving unit 220 of the user apparatus 200 may be implemented in the communication device 1004.

The input device 1005 is an input device that receives an input from the outside (for example, a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integratedly configured (for example, a touch panel).

The respective devices such as the processor 1001 and the storage device 1002 are connected via the bus 1007 to communicate information with each other. The bus 1007 may be configured with a single bus or may be configured with different buses between the devices.

Further, each of the base station apparatus 100 and the user apparatus 200 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

Conclusion of Embodiment

As described above, according to an embodiment of the invention, provided is a base station apparatus which performs communication with a user apparatus and includes a setting unit that arranges a reference signal used for phase correction in a radio frame at a predetermined interval and a transmitting unit that transmits the radio frame to the user apparatus, wherein, in a case in which the reference signal used for the phase correction is punctured in the radio frame, the reference signal used for the phase correction is arranged in a resource of the radio frame in which the reference signal used for the phase correction is arrangeable.

With the above configuration, in the wireless communication system, the PTRS is appropriately arranged, and thus it is possible improve the phase noise correction accuracy.

In a case in which the reference signal used for the phase correction is punctured in the radio frame, the reference signal used for the phase correction may be arranged in a symbol before or after a punctured symbol in the radio frame in the time domain among symbols of the radio frame in which the reference signal used for the phase correction is arrangeable and the predetermined interval may be set using the symbol in which the reference signal used for the phase correction is arranged as a starting point. With this configuration, the mapping of the PTRS close to the required insertion interval is implemented, and thus it is possible to improve the phase noise correction accuracy on the reception side device.

In a case in which the reference signal used for the phase correction is punctured in the radio frame, the reference signal used for the phase correction may be arranged in a resource closest to a punctured resource in a frequency domain among resources included in the punctured symbol in which the reference signal used for the phase correction is arrangeable. With this configuration, the mapping of the PTRS close to the required insertion interval is implicitly implemented, and thus it is possible to improve the phase noise correction accuracy on the reception side device.

In a case in which the reference signal used for the phase correction is punctured in the radio frame, an arrangement of a non-punctured reference signal used for other phase correction in the radio frame may be shifted in a time domain so that an interval at which the reference signal used for the phase correction is arranged is brought close to the predetermined interval. With this configuration, the mapping of the PTRS close to the required insertion interval is implemented, and thus it is possible to improve the phase noise correction accuracy on the reception side device.

The interval close to the predetermined interval may not include an interval equal to or larger than the predetermined interval. With this configuration, the mapping of the PTRS at the interval smaller than the predetermined interval is consistently implemented, and thus it is possible to improve the phase noise correction accuracy on the reception side device.

The predetermined interval may include only symbols including data. With this configuration, the mapping of the PTRS close to the required insertion interval is implemented, and thus it is possible to improve the phase noise correction accuracy on the reception side device.

Further, according to an embodiment of the invention, provided is a user apparatus that performs communication with a base station apparatus and includes a receiving unit that receives a radio frame from the base station apparatus and a control unit that acquires a reference signal used for phase correction from the radio frame at a predetermined interval and performs the phase correction, wherein, in a case in which the reference signal used for the phase correction is punctured in the radio frame, the reference signal used for the phase correction is acquired from a resource of the radio frame, in which the reference signal used for the phase correction is arrangeable.

With the above configuration, in the wireless communication system, the user apparatus acquires the PTRS appropriately, and thus it is possible to improve the phase noise correction accuracy.

Supplement of Embodiment

The exemplary embodiment of the invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the invention. Matters described in two or more items may be combined and used as necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station apparatus 100 and the user apparatus 200 have been described using the functional block diagrams, but such apparatuses may be implemented by hardware, software, or a combination thereof. Software executed by the processor included in the base station apparatus 100 according to the embodiment of the invention and software executed by the processor included in the user apparatus 200 according to the embodiment of the invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

A notification of information is not limited to the aspect or embodiment described in this specification and may be given by any other method. For example, the notification of information may be given physical layer signaling (for example, downlink control information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, or the like.

Each aspect and embodiment described in this specification is applicable to long term evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), and systems using any other appropriate systems and/or next generation systems expanded on the basis of the systems.

The processing procedures, the sequences, the flowcharts, and the like of the respective aspects/embodiments described in this specification may be reversed in order unless there is a contradiction. For example, the method described in this specification presents elements of various steps in an exemplary order and is not limited to a presented specific order.

In this specification, a specific action that is supposed to be performed by the base station apparatus 100 may be performed by an upper node in some cases. In the network including one or more network nodes including the base station apparatus 100, various operations performed for communication with the user apparatus 200 can be obviously performed by the base station apparatus 100 and/or any network node (for example, an MME, an S-GW, or the like is considered, but it is not limited thereto) other than the base station apparatus 100. The example in which the number of network nodes excluding the base station apparatus 100 is one has been described above, but a combination of a plurality of other network nodes (for example, an MME and an S-GW) may be provided.

Each aspect/embodiment described in this specification may be used alone, may be used in combination, or may be switched in association with execution.

The user apparatus 200 is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms, depending on those having skill in the art.

The base station apparatus 100 is also referred to as a Node B (NB)), an enhanced Node B (eNB), gNB, a base Station, or other appropriate terms, depending on those having skill in the art.

The terms "determining" used in this specification may include a wide variety of actions. For example, "determining" may include, for example, events in which events such as judging, calculating, computing, processing, deriving, investigating, looking up (for example, looking up in a table, a database, or another data structure), or ascertaining are regarded as "determining." Further, "determining" may include, for example, events in which events such as receiving (for example, receiving information), transmitting (for example, transmitting information), input, output, or accessing (for example, accessing data in a memory) are regarded as "determining." Further, "determining" may include, for example, events in which events such as resolving, selecting, choosing, establishing, or comparing are regarded as "determining." In other words, "determining" may include events in which a certain operation is regarded as "determining."

A phrase "on the basis of" used in this specification is not limited to "on the basis of only" unless otherwise stated. In other words, a phrase "on the basis of" means both "on the basis of only" and "on the basis of at least."

"Include," "including," and variations thereof are intended to be comprehensive, similarly to a term "comprising" as long as the terms are used in this specification or claims set forth below. Furthermore, the term "or" used in this specification or claims set forth below is intended not to be an exclusive disjunction.

In the entire disclosure, for example, when an article such as "a," "an," or "the" in English is added by a translation, such an article is assumed to include the plural unless it is obviously indicated that such an article does not include the plural.

In an embodiment of the invention, the PTRS is an example of the reference signal used for phase correction. The reference signal setting unit 140 is an example of a setting unit. The resource specified by a symbol and a sub carrier is an example of a resource. A set of resources specified by one slot or 14 symbols and 12 sub carriers is an example of a radio frame. The reference signal processing unit 240 is an example of a processing unit.

Although the invention has been described above in detail, it is obvious to those having skill in the art that the invention is not limited to the embodiments described in this specification. The invention can be carried out as revisions and modifications without departing from the gist and scope of the invention decided in claims set forth below. Therefore, the description of this specification is intended to be exemplary and does not have any restrictive meaning to the invention.

EXPLANATIONS OF LETTERS OR NUMERALS

100 BASE STATION APPARATUS
200 USER APPARATUS
110 TRANSMITTING UNIT
120 RECEIVING UNIT
130 SETTING INFORMATION MANAGING UNIT
140 REFERENCE SIGNAL SETTING UNIT
200 USER APPARATUS
210 TRANSMITTING UNIT
220 RECEIVING UNIT
230 SETTING INFORMATION MANAGING UNIT
240 REFERENCE SIGNAL PROCESSING UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A base station that performs communication with a terminal, comprising:
a setting unit that arranges Phase Tracking Reference Signals (PTRSs) in a radio frame at a predetermined interval; and
a transmitting unit that transmits the radio frame to the terminal,
wherein, in a case in which a PTRS is punctured in the radio frame, the PTRS is arranged,
based upon a transfer rate of a modulation scheme, in a resource of the radio frame in which the PTRS is arrangeable.

2. The base station according to claim 1, wherein, in a case in which the PTRS is punctured in the radio frame, the PTRS is arranged in a symbol before or after a punctured symbol in the radio signal in a time domain among symbols of the radio frame in which the PTRS is arrangeable and the predetermined interval is set using the symbol in which the PTRS is arranged as a starting point.

3. The base station according to claim 2, wherein the predetermined interval includes only symbols including data.

4. The base station according to claim 1, wherein, in a case in which the PTRS is punctured in the radio frame, the PTRS is arranged in a resource closest to a punctured resource in a frequency domain among resources included in the punctured symbol in which the PTRS is arrangeable.

5. The base station according to claim 4, wherein the predetermined interval includes only symbols including data.

6. The base station according to claim 1, wherein, in a case in which the PTRS is punctured in the radio frame, an arrangement of a non-punctured reference signal used for other phase correction in the radio frame is shifted in a time domain so that an interval at which the PTRS is arranged is brought close to the predetermined interval.

7. The base station according to claim 6, wherein the predetermined interval includes only symbols including data.

8. The base station according to claim 1, wherein the predetermined interval includes only symbols including data.

9. A terminal that performs communication with a base station, comprising:
a receiving unit that receives a radio frame from the base station; and
a processing unit that acquires Phase Tracking Reference Signals (PTRSs) from the radio frame at a predetermined interval and performs phase correction,
wherein, in a case in which a PTRS is punctured in the radio frame, the PTRS is acquired from a resource of the radio frame in which the PTRS is arrangeable, and
wherein the PTRS is arranged in the resource of the radio frame according to a transfer rate of a modulation scheme.

* * * * *